US010513988B2

United States Patent
(12) United States Patent
Potel et al.

(10) Patent No.: US 10,513,988 B2
(45) Date of Patent: Dec. 24, 2019

(54) FUEL CIRCUIT COMPRISING MEANS FOR CONTROLLING A PUMP

(75) Inventors: Nicolas Potel, Maisons Alfort (FR); Nicolas Alain Bader, Vaux le Penil (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 724 days.

(21) Appl. No.: 14/009,933

(22) PCT Filed: Apr. 12, 2012

(86) PCT No.: PCT/FR2012/050805

§ 371 (c)(1),
(2), (4) Date: Oct. 4, 2013

(87) PCT Pub. No.: WO2012/140373

PCT Pub. Date: Oct. 18, 2012

(65) Prior Publication Data

US 2014/0023525 A1 Jan. 23, 2014

(30) Foreign Application Priority Data

Apr. 14, 2011 (FR) ..................................... 11 53233

(51) Int. Cl.
*F02C 9/46* (2006.01)
*F02C 7/236* (2006.01)
(Continued)

(52) U.S. Cl.
CPC ................ *F02C 9/46* (2013.01); *F02C 7/232* (2013.01); *F02C 7/236* (2013.01); *F04B 23/04* (2013.01); *F05D 2270/301* (2013.01)

(58) Field of Classification Search
CPC .. F04B 23/04; F02C 9/46; F02C 7/236; F02C 7/232; F05D 2270/301
(Continued)

(56) References Cited

U.S. PATENT DOCUMENTS 2,640,423 A * 6/1953 Boyer ...................... F02C 7/22
60/39.281
3,801,228 A * 4/1974 Mueller ................. F04B 23/12
60/39.281
(Continued)

FOREIGN PATENT DOCUMENTS

EP 1 849 975 10/2007
EP 2 088 302 8/2009
(Continued)

OTHER PUBLICATIONS

International Search Report dated Aug. 6, 2012 in PCT/FR12/050805 Filed Apr. 12, 2012.
(Continued)

*Primary Examiner* — Ted Kim
(74) *Attorney, Agent, or Firm* — Oblon, McClelland, Maier & Neustadt, L.L.P.

(57) ABSTRACT

A turbomachine fuel circuit including: a low pressure pump; a high pressure pump; a low pressure conduit connecting the low pressure pump to the high pressure pump; a high pressure conduit supplied by the high pressure pump, in which a component is arranged; a mechanism for testing operation of the component; a check valve capable of closing off a segment of the conduit when the pressure in the low pressure conduit is less than a predetermined threshold value; and the testing mechanism is capable of detecting that the check valve at least partly closes off the segment.

6 Claims, 1 Drawing Sheet

10 32 34 36 32 20 38 40 18 40 12 24 14 30 40 22 26 28 16 32

(51) Int. Cl.
*F02C 7/232* (2006.01)
*F04B 23/04* (2006.01)

(58) Field of Classification Search
USPC ............................................ 60/39.34, 39.281
See application file for complete search history.

(56) References Cited

U.S. PATENT DOCUMENTS 4,375,745 A 3/1983 Schelp
4,760,696 A 8/1988 Rooks et al.
5,116,362 A * 5/1992 Arline .................... F02C 7/236 60/734
5,168,704 A * 12/1992 Kast ......................... F02C 9/48 60/420
7,891,165 B2 2/2011 Bader et al.
8,205,597 B2 * 6/2012 Brocard ................. F02C 7/236 60/790
2004/0117102 A1 6/2004 Weir et al.
2007/0044768 A1 * 3/2007 Eick ......................... F02C 7/22 123/478
2007/0245744 A1 10/2007 Dooley
2008/0296403 A1 12/2008 Futa et al.
2009/0199823 A1 8/2009 Mahoney et al.
2009/0211558 A1 * 8/2009 Anson .................... F02C 7/236 123/497
2010/0115959 A1 5/2010 Anson et al.
2010/0199681 A1 8/2010 Dooley
2010/0242431 A1 * 9/2010 Baker .................... F02C 7/236 60/39.281
2010/0257867 A1 * 10/2010 Aurousseau ........... F02C 7/236 60/779
2012/0204532 A1 8/2012 Potel et al.
2012/0204572 A1 8/2012 Bader

FOREIGN PATENT DOCUMENTS

FR 2882095 * 8/2006 ................ F02C 7/22
FR 2 931 885 12/2009
GB 758 679 10/1956
GB 2 180 005 3/1987

OTHER PUBLICATIONS

U.S. Appl. No. 13/369,628, filed Dec. 9, 2012, 2012-0204532, Potel, et al.
U.S. Appl. No. 13/372,777, filed Feb. 14, 2012, 2012-0204572, Bader.

* cited by examiner

FUEL CIRCUIT COMPRISING MEANS FOR CONTROLLING A PUMP

TECHNICAL FIELD

The invention discloses a turbomachine fuel circuit comprising means of detecting a failure of a fuel supply pump.

More particularly, the invention discloses a fuel circuit limiting the number of failure sensors of circuit components.

STATE OF PRIOR ART

The fuel circuit of an aircraft turbomachine comprises mainly a low pressure pump feeding a high pressure pump, and the high pressure pump feeding the various components of the turbomachine. The fuel flow and pressure at the outlet from the low pressure pump is sufficient to force feed the high pressure pump.

The low pressure pump itself is supplied with fuel by an aircraft feed pump.

If there is a failure of the low pressure pump, the fuel pressure supplying the high pressure pump is relatively low. It follows that the high pressure pump must satisfy strict constraints if it is to output a sufficient fuel pressure.

These more severe constraints cause premature wear of the high pressure pump and a risk of failure of the pump when the aircraft is in flight.

It has been proposed that the risk of in-flight failure of the high pressure pump caused by the low pressure pump can be reduced by periodic inspections of the low pressure pump, visual verifications, or using a sensor with the low pressure pump to detect failure of the pump.

The use of a sensor makes it possible to automatically detect failure of the low pressure pump so that an appropriate maintenance operation can be performed.

Such a testing method with a sensor associated with the low pressure pump makes the electronic system of the turbomachine more complex, and a communication channel must be associated with each sensor.

This also increases the cost and mass of the turbomachine, particularly because of the presence of long electrical cables.

The purpose of the invention is to disclose means of automatically detecting a failure or degradation of the low pressure pump so that the number of sensors used in the fuel circuit can be reduced.

PRESENTATION OF THE INVENTION

The invention discloses a turbomachine fuel circuit that comprises:

- a low pressure pump feeding the fuel circuit with fuel under pressure,
- a high pressure pump supplied with fuel by the low pressure pump,
- a low pressure conduit connecting the low pressure pump to the high pressure pump,
- at least one high pressure conduit supplied with fuel by said high pressure pump, in which at least one component of the turbomachine is arranged, said high pressure conduit comprising a segment feeding said turbomachine component,
- means of testing operation of said at least one component of the turbomachine, characterised in that it comprises a check valve capable of at least partly closing off a segment of said at least one conduit associated with the component, when the fuel pressure in the low pressure conduit is less than a predetermined threshold value, and in that said testing means are capable of detecting that the check valve is at least partly closing off said segment.

Detecting a failure of the low pressure pump by the turbomachine component testing means, permits to not use the sensor associated with the low pressure pump, while maintaining the low pressure pump failure detection function.

Preferably, the check valve is actuated directly by the fuel in the low pressure conduit.

Preferably, the fuel circuit comprises a conduit directly connecting the check valve to the conduit into which the pump discharges.

Preferably, the check valve is arranged in a segment of the conduit upstream from said component.

Preferably, the check valve is arranged in a segment of the conduit downstream from said component.

Preferably, the pressure in the low pressure conduit varies depending on the speed of the turbomachine, and said threshold value is approximately equal to the minimum value of the pressure that the low pressure pump is capable of producing, regardless of the operating conditions of the turbomachine.

Preferably, the check valve is capable of completely closing off the segment when the value of the pressure in the low pressure conduit is less than said threshold value.

Preferably, the check valve is capable of partly closing off the segment when the value of the pressure in the low pressure conduit is less than said threshold value.

The invention also discloses an aircraft turbine comprising a low pressure pump feeding fuel to a high pressure pump, characterised in that it comprises a fuel circuit comprising a check valve according to any one of the invention.

BRIEF DESCRIPTION OF THE DRAWINGS

Other characteristics and advantages of the invention will become clear after reading the detailed description given below which will be more easily understood by referring to the appended figures in which.

DETAILED PRESENTATION OF PARTICULAR EMBODIMENTS

Figure 1:
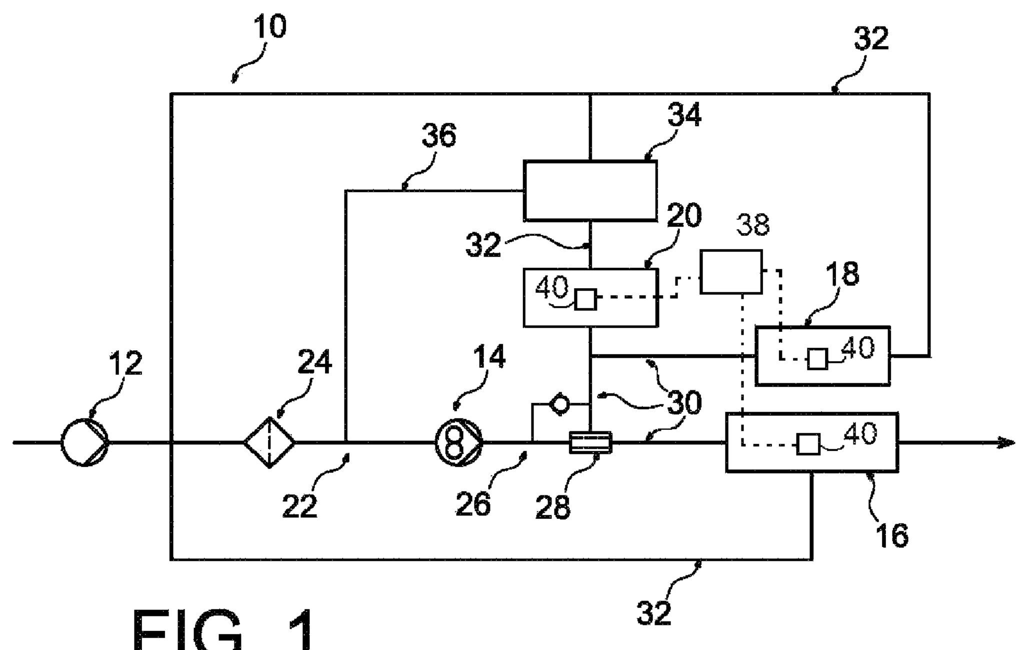
FIG. 1 is a diagrammatic view of a fuel circuit according to the invention, in which the low pressure pump is in a functional state.

FIG. 1 shows a fuel circuit 10 of a turbomachine such as an aircraft jet engine.

The fuel circuit 10 comprises a low pressure pump 12 that feeds the fuel circuit 10. The fuel pressure at the low pressure pump's outlet can be as high as 12 bars.

The fuel circuit 10 also comprises a high pressure pump 14 supplied with fuel through the low pressure pump 12 and that supplies fuel at a high pressure.

This fuel at high pressure will feed turbomachine components including a fuel proportioning unit 16 that delivers fuel to the combustion chamber, to turbomachine variable geometry blade actuators 18 or to valves 20 providing a means of controlling a radial clearance between the mobile blades and a fixed casing.

The fuel circuit 10 comprises a low pressure conduit 22 connecting the low pressure pump 12 to the high pressure pump 14 inside which there is a filter 24.

The fuel circuit 10 also comprises a high pressure conduit 26 connecting the high pressure pump 14 to the components 16, 18, 20 of the turbomachine.

The high pressure conduit 26 in particular comprises a distributor 28 and high pressure segments 30 distributing fuel to the components 16, 18, 20.

Each of these components 16, 18, 20 is connected to the low pressure conduit through associated return segments 32 that in this case open up on the input side of the filter 24.

Each of the components 16, 18, 20 also comprises associated means of testing 40 its operation that are connected to an electronic control device 38. These testing means 40 and the electronic control device 38 emit a special warning when a failure of one of the components 16, 18, 20 is detected.

The fuel circuit 10 also comprises a check valve 34 that is associated with a component 20 of the fuel circuit 10.

The check valve 34 is arranged so as to at least partly close off the high pressure segment 30 or the return segment 32 associated with said component 20 when the fuel pressure output from the low pressure pump 12 is less than a predefined threshold value.

In this case, the check valve 34 is actuated by the fuel in the low pressure conduit 22.

The fuel pressure at the low pressure pump "12" is outlet approximately equal to the fuel pressure in the low pressure conduit 12.

This is achieved due to a branch connection 36 that connects the low pressure conduit 22 to the check valve 34.

The check valve 34 is made so that it closes off the segment 30, 32 associated with said component 20 when the pressure in the low pressure conduit 22 is less than said predetermined threshold value.

When the fuel pressure in the low pressure conduit 22 is greater than the threshold value, the check valve is held in a position in which it does not close off the segment 30, 32 associated with the component 20, so that it does not prevent it from functioning.

For example, the check valve 34 comprises a return spring towards the closed position that is compressed under the action of the fuel pressure and that is calibrated as a function of the threshold value.

The output fuel pressure from the low pressure pump 12 varies with the speed of the turbomachine. This is done, as a non-limitative example, by defining the value of the pressure threshold at which the check valve 34 closes off the segment 30, 32 as being the minimum value of the fuel pressure at the output from the low pressure pump 12 corresponding to the minimum speed of the turbomachine, for example the idle speed of the turbomachine.

When the fuel pressure in the low pressure conduit 22 is less than the threshold value, the check valve at least partly closes off the segment 30, 32 associated with the component 20.

Closing off the segment 30, 32 causes an operating defect such as a deceleration or complete stop of component 20.

The testing means 40 associated with the component 20 are capable of detecting this functional defect caused by closing provoked by the check valve 34, and a warning is sent to the electronic control device 38.

This warning can be analysed as a failure of the component 20 or the low pressure pump 12.

Thus, subsequent to this warning, the component 20 and the low pressure pump 12 are inspected to verify which of the component 20 and/or the lower pressure pump 12 is out of service.

As can be seen in FIG. 1, when the low pressure pump 12 is in a functioning condition, the value of the pressure in the low pressure conduit 22 is higher than the threshold value.

The fuel pressure then holds the check valve 34 in its position to open the segment 32 in which it is located.

Therefore the check valve 34 does not prevent operation of the associated component 20.

Figure 2:
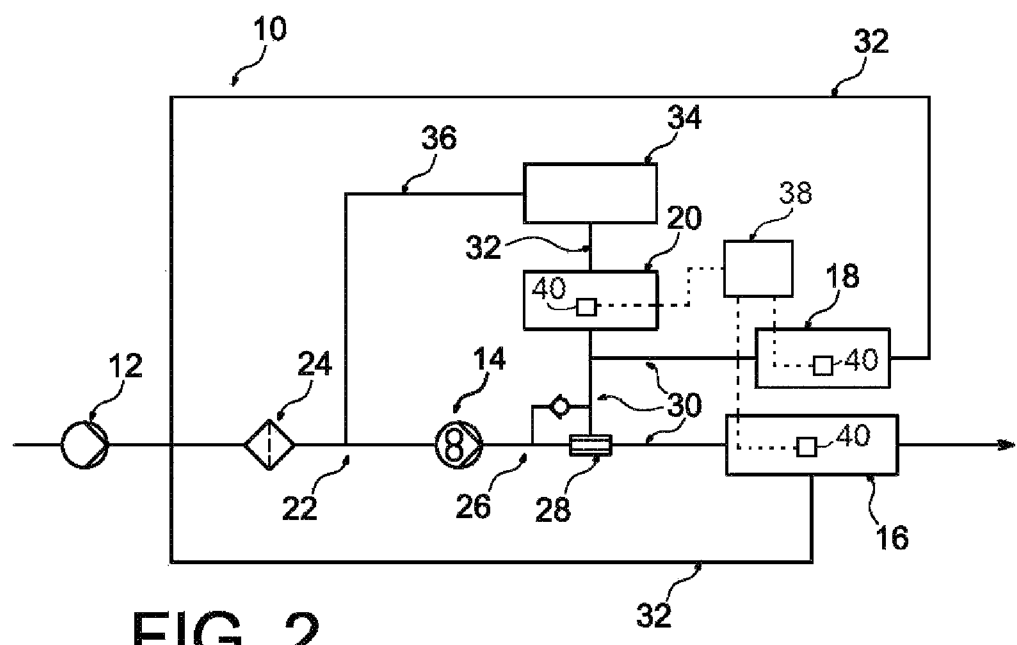
FIG. 2 is a view similar to FIG. 1, in which the low pressure pump is not in a functional state.

On the other hand, as can be seen in FIG. 2, when the low pressure pump 12 is out of service, the fuel pressure in the low pressure conduit 22 is less than the threshold value.

The check valve 34 is then in its position to at least partially close segment 32. In this case, the check valve 34 completely closes off the segment 32 and this is why the part of the segment 32 on the output side of the check valve 34 is not shown.

The component 20 can then no longer function correctly. The component testing means 40 can thus detect this component failure and the electronic control device 38 issues a warning.

As can be seen in FIGS. 1 and 2, the check valve 34 is located in the return segment 32 associated with component 20, in other words on the downstream side of component 20 such that when the check valve 34 is closed, fuel can no longer be output from the component 20.

According to one variant embodiment not shown, the check valve 34 is located in the high pressure segment 30 feeding the component 20, in other words on the upstream side of component 20. Thus, when the valve 34 is closed, the component 20 is not supplied with fuel.

According to a first embodiment of check valve 23, the check valve is also made so as to close off the entire segment 30, 32 in which it is located, so as to completely prevent operation of the component 20.

According to another embodiment of the check valve 34, the check valve is made so as to only partially close off the segment 30, 32 in which it is located, so as to limit operation of the component 20, for example to slow functioning of the component 20.

The testing means of the component 20 are then made to be capable of detecting this limited functioning and/or idle running of the component 20.

According to another aspect of the check valve 34, the component 20 associated with the check valve 34, in other words in the segment 30, 32 in which the check valve 34 is located, is a component 20 for which the interrupted or limited functioning caused by complete or partial closure of the check valve 34 is not likely to interrupt functioning of the turbomachine.

As a non-limitative example, the component 20 is a valve regulating an air flow that can control a radial clearance between the tips of the low pressure turbine blades and the casing of the low pressure turbine.

The invention claimed is:

1. A turbomachine fuel circuit comprising:

a low pressure pump feeding the fuel circuit with fuel under pressure;

a high pressure pump supplied with fuel by the low pressure pump;

a low pressure conduit connecting the low pressure pump to the high pressure pump;

at least one high pressure conduit to be supplied with fuel by the high pressure pump and in which at least one component of the turbomachine is arranged, the high pressure conduit comprising a segment feeding the at least one component of the turbomachine;

a sensor to test operation of the at least one component of the turbomachine; and a check valve that is located in said high pressure conduit, and is to at least partly close off the segment of the at least one high pressure conduit associated with and in serial flow with the at least one component of the turbomachine when fuel pressure in the low pressure conduit is less than a predetermined threshold value;

wherein the sensor detects whether the check valve is at least partly closing off the segment, and wherein the check valve is actuated directly by the fuel in the low pressure conduit.

2. The fuel circuit according to claim 1, further comprising a conduit directly connecting the check valve to the low pressure conduit supplied by the low pressure pump.

3. The fuel circuit according to claim 1, wherein the check valve is arranged in a segment of the at least one high pressure conduit downstream from the at least one component of the turbomachine.

4. The fuel circuit according to claim 1, wherein the pressure in the low pressure conduit varies depending on a speed of the turbomachine, and wherein the threshold value is approximately equal to a minimum value of the pressure that the low pressure pump is capable of producing, regardless of operating conditions of the turbomachine.

5. The fuel circuit according to claim 1, wherein the check valve is capable of completely closing off the segment when the value of the pressure in the low pressure conduit is less than the threshold value.

6. An aircraft turbine comprising:

the turbomachine fuel circuit according to claim 1.

* * * * *